Oct. 21, 1969 R. C. POWERS 3,473,299
INTERNAL-COMBUSTION ENGINE AIR FILTERING APPARATUS
Filed Dec. 26, 1967
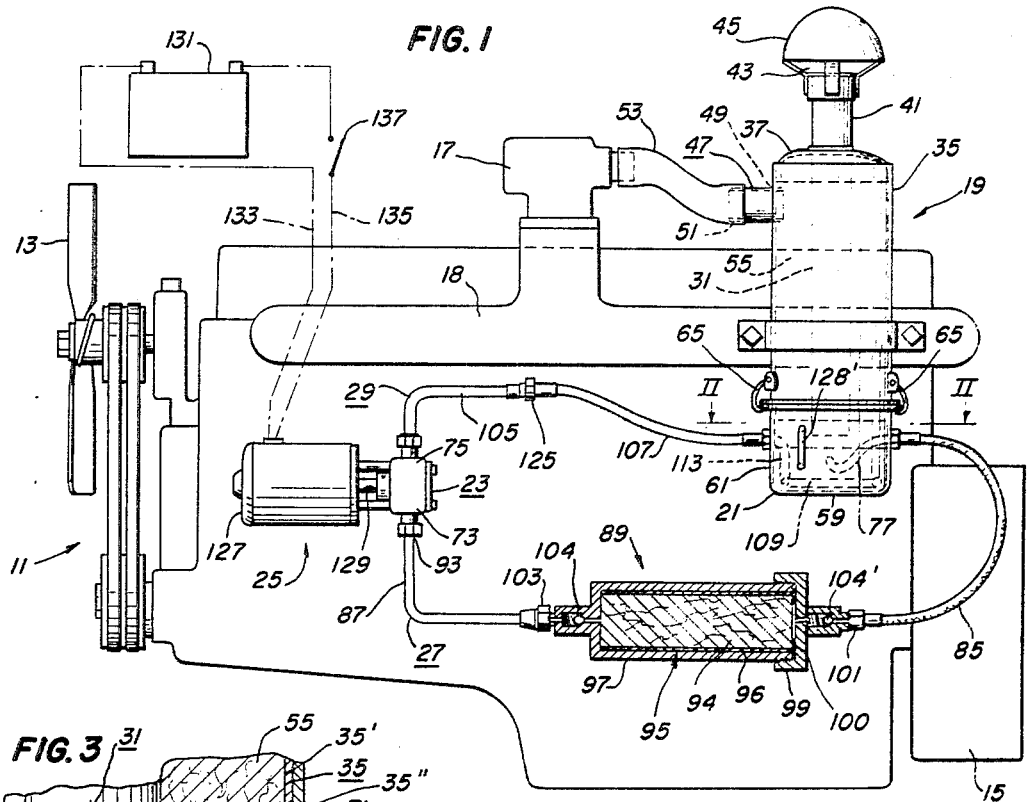
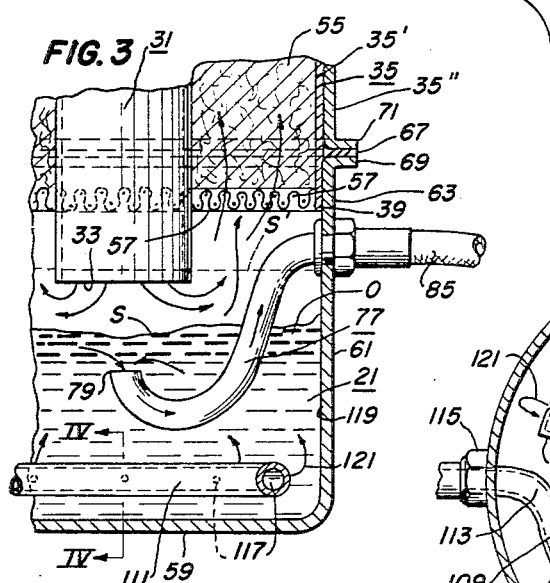
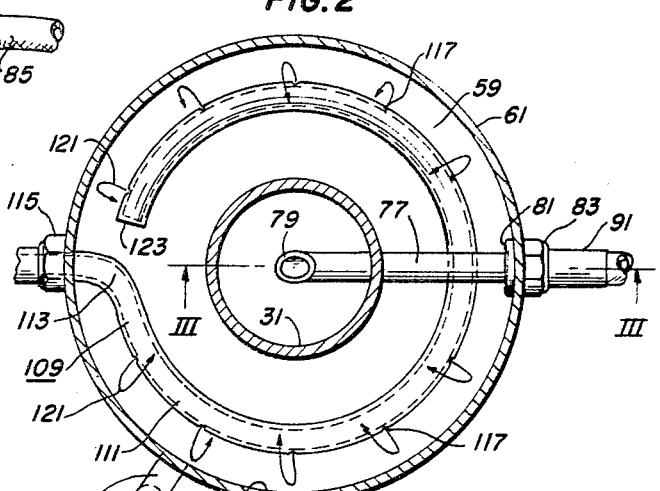
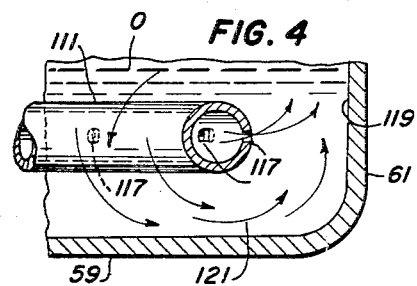
INVENTOR.
RICHARD C. POWERS
BY John R. Walker, III
Attorney United States Patent Office 3,473,299
Patented Oct. 21, 1969

3,473,299
INTERNAL-COMBUSTION ENGINE AIR
FILTERING APPARATUS
Richard C. Powers, Memphis, Tenn., assignor of ten
percent each to Jere Esch, James R. Farrell, Richard
T. Farrell, and James Moore, all of Memphis, Tenn.
Filed Dec. 26, 1967, Ser. No. 693,602
Int. Cl. B01d 47/02
U.S. Cl. 55—228                                    9 Claims

ABSTRACT OF THE DISCLOSURE

Combustion air filtering apparatus for an internal-combustion engine—the apparatus including vertical tubular means for conducting atmospheric air downwardly and then upwardly through a fibrous filter and into the intake manifold system of the engine. The apparatus includes a cuplike base adapted to contain oil for saturating the filter and increasing the filtering action of the filter. The apparatus further including oil circuit means for continuously cleaning and circulating the oil through the cuplike base. The apparatus in effect providing means for filtering the oil which filters the combustion air entering the combustion chamber of the engine.

BACKGROUND OF THE INVENTION

Field of the invention

This invention relates to air cleaning apparatus for internal combustion engines and particularly to such apparatus having means for filtering the oil utiled for saturating the air filter elements in the air cleaner of an engine. The invention particularly relates to air cleaning apparatus utilized in automotive vehicles or in heavy duty earthworking machines.

Description of the prior art

Various oil-filtering means have been designed for filtering the oil of the oil saturated filter elements of an air cleaning system. Many of the prior art devices have included substantially large sediment tanks which contain large quantities of oil. The prior art sediment tank type devices filtered the air cleaner filter oil by settling out the dirt and foreign matter in the tank. Patents No. 2,778,444 and 2,778,446 disclose air cleaner oil filtering apparatus utilizing a sediment tank for settling the foreign matter from the air filter oil. A problem with such prior art devices was the substantial amount of space required for the installation of the device. This particularly presented a problem when the installation was in an automobile engine or the engine of a heavy equipment mobile vehicle. The large sump tank of the prior art oil filter air cleaner apparatuses also required a substantial amount of oil for proper operation.

Many prior art devices also were of complicated or intricate construction and presented maintenance problems. For example, Patent No. 2,778,446 includes a drip pan, various oil manifolds, electrically operated solenoid valves and various other complicated parts subject to malfunction in operation. Certain prior art devices included baffles mounted in the oil cup base of the air cleaner for causing the oil to flow or not to flow in a particular way. Patent No. 2,779,431 illustrates an air cleaner having an oil cup base provided with baffles for causing the oil to flow upwardly into the filter element of the air cleaner. Air cleaner oil cups having baffle means mounted in the cup are difficult to clean; the dirt filtering downwardly from the air filter element settles beneath the baffle members of the oil cup and the cup is difficult to clean properly.

Patent No. 2,012,962 illustrates an engine air cleaner utilizing the engine lubricating oil pressure system of the engine for cleaning the air cleaner oil. In an air filter oil cleaning system such as this there is considerable likelihood of dirt or grit from the combustion air entering the lubricating system of the engine and damaging the engine, and the engine oil must be cooled to be effective in the air filtering system. In addition, the engine oil has carbon and acids that are undesirable and cannot be cleaned as such.

Another problem with prior air cleaners of the oil bath type is dirt accumulating in the air filter mass resulting in more gas consumption from the reduction in volume of air available.

SUMMARY OF THE INVENTION

The apparatus of the present invention does not include complicated structure such as solenoid valves, drip pans, large sump tanks, baffles or other such structure. The invention includes a circular tubular loop mounted in the oil cup base of an air cleaner structure and provides means for introducing the clean oil into the base. A plurality of radially arranged ports in the tubular loop causes the oil to be distributed evenly around the inside periphery of the base in a position directly below the filter mass of the air cleaner structure to be picked up thereby. The base cup is provided with a suction tube or nib having an inlet opening adjacent the central portion of the base for carrying the dirt and foreign material therefrom. Such material is carried by the oil flow through a disposable oil filter thereby filtering the oil and providing the clean oil hereinabove-mentioned for the air cleaner base. The air cleaner oil of the present invention is separate from the lubricating oil of the engine, thus, there is no likelihood of grit and contaminants entering the engine oil. Also, it is a simple and easy matter for a person to replace, when necessary, the disposable oil filter with a new filter.

BRIEF DESCRIPTION OF THE DRAWING

FIG. 1 is a somewhat schematic view of the air filtering apparatus of the invention illustrated in conjunction with a typical automotive type engine.

FIG. 2 is a horizontal plane cross sectional view of the air cleaner base taken as on the line II—II of FIG. 1.

FIG. 3 is a vertical plane sectional view of the air cleaner base parts taken as on the line III—III of FIG. 2.

FIG. 4 is an enlarged vertical plane sectional view taken as on the line IV—IV of FIG. 3 and illustrating the tubular loop and base cup of the air filtering apparatus of the invention.

DESCRIPTION OF THE PREFERRED EMBODIMENT

The air filtering apparatus of the invention is illustrated and will be described in conjunction with a typical automotive engine 11 having an engine cooling fan 13, flywheel housing means 15, and fuel means including a carburetor 17 and an air intake manifold 18. The air filtering apparatus of the invention includes air cleaner means 19 including a cuplike oil reservoir or cleaner base means 21, and oil circuit means including a pump 23, pump drive means 25, first conduit means 27 and second conduit means 29.

Air cleaner means 19 includes a vertical air intake tube 31 having a downwardly open end defined by a circular lower edge 33, a cylindrical shell 35 concentrically arranged around tube 31 and an annular closure member 37 concentrically fixedly arranged between the upper portions of tube 31 and shell 35. Air intake tube 31, shell 35 and closure member 37 define substantially a downwardly opening air filter chamber, generally annular in cross sectional configuration. Shell 35 is preferably of composite construction including an inner shell portion 35' and an outer shell portion 35" bonded to the inner shell portion 35' by suitable means, as welding.

The inner portion 35' preferably projects downwardly below the lower edge of outer portion 35". The arrangement of tube 31 and shell 35 is such that lower edge 33 of the tube projects a substantial distance downwardly from lower edge 39 of cylindrical shell 35. The upper portion 41 of air intake tube 31 projects upwardly from closure member 37 and opens into the atmosphere, as indicated by numeral 43. A dome-shaped cover 45 is fitted over upper portion 41 of tube 31 in a manner somewhat typical in the automotive air cleaner art.

A sleevelike air outlet conduit 47 having an upstream end 49 and downstream end 51 is fitted in the upper portion of cylindrical shell 35. Upstream end 49 of conduit 47 is sealingly secured in shell 35 and communicates with the filtering chamber of the air cleaner. A tubular flexible coupling 53 interposedly connects conduit downstream end 51 with intake manifold 18 of engine 11. A fibrous liquid permeable filter mass 55 is snugly fitted in the air cleaner filtering chamber and is secured by an annular screen 57 interposedly secured between tube 31 and shell 35.

Base 21 is adapted to be sealingly secured to the lower end portion of cylindrical shell 35 and includes a horizontal bottom wall 59 and a circular lateral wall 61 extending upwardly from bottom wall 59. The circular upper edge portion 63 of base 21 is adapted to be sealingly secured over the lower edge of inner portion 35' of air cleaner shell 35. Snap-over clip-type fastening means including a pair of resilient clip members 65 provide means for removably securing base 21 subjacently on air cleaner shell 35. An annular seal 67 fitted between corresponding flanges 69, 71 respectively of base 21 and shell 35 provides air and oil seal means between the base and shell.

When engine 11 is operating, atmospheric air is drawn downwardly through air cleaner intake tube 31 into base 21 and then upwardly through filter mass 55 and into carburetor 17 and air intake manifold 18 of the engine. The upward flow of air through cleaner 19 causes droplets of oil to move upwardly through filter mass 55 and saturate the filter mass with oil. The oil liquid is indicated by letter O in FIG. 3. It will be understood that when engine 11 is running, a partial amount of the oil contained in base 21 is drawn upwardly into air cleaner 19 and remains thus while the engine is operating at a considerable speed. As the speed of the engine is reduced or fluctuates, the oil will move upwardly and downwardly in filter mass 55 carrying with it dirt and foreign material filtered from the air. The oil flowing downwardly into base 21 carries with it the dirt and foreign material into the base and thus cleans filter mass 55. FIG. 3 illustrates air cleaner 19 when engine 11 is running: The oil surface, indicated S, is disposed substantially below lower edge 33 of air intake tube 31. The horizontal broken line, indicated S' in FIG. 3 illustrates the oil surface level when the engine is idle and the oil has drained from filter mass 55.

The oil circuit means, including pump 23, pump drive 25 and first and second conduit means 27, 29 is adapted for continuously circulating and cleaning oil O in base 21 of the air cleaner. For example, pump 23 provides 10 p.s.i. of pressure to circulate the oil at the rate of 2½ to 3 gallons per minute. First conduit means 27 communicates intake side 73 of the pump with the interior of base 21. Second conduit means 29 communicates output side 75 of the pump with the interior of base 21.

First conduit means 27 includes an upstream terminal portion in the form of a tubular nib 77 fixedly arranged in the interior of base 21. Tubular nib 77 is generally J-shaped and is supported cantilever fashion from one side of base lateral wall 61.

The distal end portion of tubular nib 77 is cut slightly diagonally and defines an inlet opening 79 opening upwardly directly under circular lower edge 33 of air cleaner intake tube 31, and is preferably concentric therewith. Tubular nib 77 extends generally downwardly from inlet opening 79 and then upwardly and is secured in base wall 61 by a shoulder portion 81 and threaded fastener means 83. The tubular intersection of nib 77 with base lateral wall 61 is at a level substantially above the level of inlet opening 79 of the tubular nib.

First conduit means 27 includes an upstream section preferably in the form of a flexible tube 85; a downstream section preferably in the form of a rigid tube 87; and oil filtering means 89 interposedly connecting tubes 85, 87. Inlet end 91 of tube 85 is communicatingly coupled with threaded fastener 83 of tubular nib 77. Outlet end 93 of tube 87 is communicatingly fitted in intake side 73 of pump 23. Oil filtering means 89 includes a generally cylindrical disposable filter 94 including a mass 95 of dense porous material in a sleeve 96 of cardboard or the like; filter housing means including a sleevelike body 97, a cap 99; and tubular coupling means 101, 103 coupling respectively upstream and downstream tubes 85, 87 to body 97 and cap 99. Cap 99 having a gasket 100 is removably threadedly sealingly fitted on the open end of body 97 and provides access means into the interior of the body. Filter 95 is snugly fitted in body 97 but may be easily withdrawn for changing. Oil is drawn through first conduit 27 from base 21 through oil filter 95 and into intake side 73 of pump 23. A spring-closed ball type check valve 104 is fitted in the closed end of filter housing body 97. Check valve 104 provides means for preventing reverse flow of oil from downstream tube 87 into filter body 97. Check valve 104 is particularly useful for preventing oil leaking from tube 87 when filter mass 95 is being replaced or the oil filtering means is being serviced. Another check valve 104' is provided in cap 99 for the same general purpose.

Second conduit means 29 includes tube means including an upstream tubular section 105, a downstream tubular section 107, and a tubular loop 109 arranged in the interior of air cleaner base 21. Tubular section 107, as well as tube 85, are preferably flexible so that the oil may be changed in base 21. FIGS. 2 and 3 illustrate the circular configuration of loop 109 and its arrangement relative to air cleaner base 21.

Loop 109 includes a circular main portion 111 arranged substantially horizontally and a generally vertical mounting portion 113. Tubular coupling means 115 arranged on the proximal end of loop mounting portion 113 supports loop 109 in cantilever fashion from base lateral wall 61. Circular main portion 111 of loop 109 is arranged horizontally and concentrically respectively relative to the bottom and lateral walls 59, 61 of base 21. Circular loop portion 111 is provided with a plurality of ports 117 formed in the tubular wall of portion 111. Ports 117 are spaced circumferentially and uniformly along the circular length of loop portion 111. Ports 117 are formed in the outer circumferential wall portion of loop portion 111 and each port is directed outwardly radially relative to the loop portion.

Ports 117 are adapted to cause a plurality of submerged jets of oil radiating outwardly and toward laterial wall 61 of base 21. The streams of radically directed submerged jets of oil flow against inside surface 119 of base wall 61. Arrows, indicated 121, illustrate the flow of oil generated by the radially directed oil jets issuing from the ports 117. Oil under pressure is forced from output side 75 of pump 23 through tubular sections 105, 107 and into loop 109. The closed end restriction 123 of loop portion 111 causes the oil to flow through ports 117 and provides continuous flow of oil through base 21. This discharge of oil in a plurality of small jets reduces or prevents splashing which otherwise might occur, as for example, with a single large opening. Also, it should be pointed out that by this arrangement of loop portion 111 directly below filter mass 55, the clean oil is distributed evenly around the inside periphery of base 21 in a position directly below the filter mass 55 to be picked up into the filter mass, as heretofore described. By the same token, the dirty oil is concentrated in the center of base 21 to be discharged through inlet opening 79.

Downstream tubular section 107 between couplings 115, 125 is preferably formed of clear transparent plastic tubing. The clear tubing material of downstream section 107 provides sight means for monitoring the flow of oil passing through second conduit means 29. A sight gage 128 is preferably provided for base 21 so that the oil level therein may be determined. Sight gage 128 is of any suitable construction and shape, as for example, with the vertical portion 128' thereof being transparent and the upper and lower horizontal portions 128" (only the upper one is shown) communicating the upper and lower ends of the vertical portion with the interior of base 21.

Oil pump 23 preferably is driven electrically. Drive means 25 preferably includes an electric motor 127 coupled to drive pump 23 through shaft 129, and includes a battery 131, conductor means 133, 135 and manually operable switch means 137. In an automotive vehicle installation, switch means 137 is preferably incorporated with the ignition lock-switch means of the vehicle. In such an installation, as the ignition switch is turned on, motor 127 is energized, thus causing oil to flow through first and second conduit means 27, 29 and air cleaner base 21.

I claim:
1. In an internal combustion engine air filtering apparatus of the oil bath type including air filter means and an oil reservoir base for supplying oil to the air filter means; oil circuit means including first conduit means communicated with generally the central interior of said reservoir, said first conduit means having an inlet opening disposed generally centrally of said reservoir and second conduit means communicated with the interior of said reservoir at a place in spaced apart from relationship to and generally below and generally concentric with said first conduit means inlet opening, removable porous oil filtering means interposed in said oil circuit means, and pump means interposed in said oil circuit means downstream of said filtering means for causing the dirty oil in said reservoir to flow therefrom through said first conduit means, through said oil filtering means for the cleaning thereof, and through said second conduit means back into said reservoir.

2. The apparatus of claim 1 in which said first conduit means includes an upstream terminal portion in the form of a tube having on its extreme end said inlet opening and in which said second conduit means includes a tubular circular loop disposed in said base concentric with said inlet opening, and said loop being provided with a plurality of ports therein.

3. Internal-combusion engine combustion air filtering apparatus comprising a vertical air intake tube having a downwardly opening open end defined by a circular lower edge arranged along a horizontal plane and having an open upper end opening to the atmosphere, a generally cylindrical shell concentrically arranged about said tube, said shell having structure defining a circumferential lower edge arranged along a horizontal plane, radially directed closure structure interposedly sealingly concentrically arranged between the upper portions of said tube and said shell, said tube, shell and closure structure defining substantially a downwardly opening air filter chamber, single passageway air inlet conduit means having a upstream end sealingly communicating with the interior of said shell adjacent the upper portion of said shell, and having a downstream end adapted for securement to and communication with the air intake structure of an internal-combustion engine, a porous liquid permeable filter mass arranged in the air filter chamber between said tube and said shell, a cuplike base having a vertical circularly extending lateral wall and a generally horizontal bottom wall, means securing said base on said shell with the upper margin of said base lateral wall sealingly engaging said shell and with the lower open end of said air intake tube projecting downwardly and a substantial distance into the interior of said base, said base being adapted to contain a quantity of oil, oil conduit means adapted for continuously circulating and cleaning the oil in said base including a pump, means for driving said pump, first conduit means communicating the intake side of said pump with the interior of said base, and second conduit means communicating the output side of said pump with the interior of said base, said first conduit means including an upstream terminal portion in the form of a tubular nib fixedly arranged in the interior of said base and having on its extreme end an inlet opening opening upwardly directly under the circular lower edge of said tube, said second conduit means including a downstream terminal portion in the form of a horizontal tubular circular loop fixedly arranged in the interior of said base, said tubular loop having a closed terminal end and including structure defining a plurality of ports formed in the tubular wall of said loop spaced circumferentially and along the circular length of said loop, each port being oriented outwardly radially relative to said loop, and oil filtering means interposedly fitted in said first conduit means for filtering dirt and foreign material from oil passing through said first conduit means.

4. An apparatus according to claim 3 wherein said first conduit means includes a tubular upstream section having an outlet end and a downstream section having an inlet end, and wherein said oil filtering means includes a generally cylindrical filter mass formed of dense porous material, filter housing means arranged closely about said filter mass including a sleevelike cylindrical body having a closed end and an open end and including a cap removably sealingly secured on the open end of said body, and includes tubular coupling means communicatingly coupling respectively said outlet end of the upstream section of said first conduit means with the cap end of said filter housing means, and the inlet end of said downstream section of said first conduit means with the closed end of the sleevelike body of said filter housing; the arrangement being adapted to conduct oil passing through said first conduit means through said filter mass.

5. An apparatus according to claim 3 wherein said tubular nib of said first conduit means is generally J-shaped and is supported cantilever fashion from said base lateral wall, said tubular nib being configured to extend generally downwardly from its upwardly opening inlet opening and then upwardly and radially outwardly relative to said base, and further with the tubular intersection of said nib with said base lateral wall being at a level substantially above the level of the inlet opening of said nib.

6. An apparatus according to claim 4 which additionally includes check valve means fitted in the closed end of said filter housing body communicating with the inlet end of the downstream section of said first conduit means, said check valve means being arranged to permit substantially free passage of oil from said filter housing into said downstream section but to prevent a reverse flow of oil into said filter housing.

7. An apparatus according to claim 4 which includes additional check valve means fitted in said cap communicating with the outlet end of said upstream section of said first conduit means.

8. An apparatus according to claim 6 wherein said second conduit means includes, in addition to said loop, an upstream section and a downstream section and wherein said downstream section is formed substantially of clear transparent tubing defining sight means for monitoring the flow of oil passing through said second conduit means.

9. An apparatus according to claim 3 wherein said means for driving said oil pump includes an electric motor having a drive shaft drivingly coupled to said switch means for selectively energizing said motor and pump.

References Cited

UNITED STATES PATENTS

| | | | |
|---|---|---|---|
| 314,415 | 3/1885 | Babcock | 261—5 |
| 919,249 | 4/1909 | Ruddiman | 261—119 |
| 970,982 | 9/1910 | Bond | 210—446 |
| 1,465,475 | 8/1923 | Hope | 261—126 X |
| 1,694,804 | 12/1928 | Turner | 210—136 |
| 1,840,253 | 1/1932 | Richardson. | |
| 1,952,740 | 3/1934 | Winslow | 123—196 |
| 2,012,962 | 9/1935 | Hagar | 55—228 |
| 2,490,959 | 12/1949 | Gregory | 55—252 |
| 2,778,446 | 1/1957 | McKinley | 261—36.0 |
| 2,812,751 | 11/1957 | Nallinger | 123—119 |
| 2,830,673 | 4/1958 | Bungas | 55—228 X |
| 2,990,910 | 7/1961 | Kimmell | 55—228 X |
| 3,109,630 | 11/1963 | Nichols | 259—4 |
| 3,167,507 | 1/1965 | Burhans et al. | 210—136 |
| 3,350,322 | 10/1967 | Waterhouse | 252—362 |
| 3,431,898 | 3/1969 | Driscoll et al. | |

FOREIGN PATENTS 879,839   12/1942   France.

HARRY B. THORNTON, Primary Examiner

D. E. TALBERT, JR., Assistant Examiner

U.S. Cl. X.R.

55—233, 253, 259, 274, 385, 421; 123—119; 210—136; 261—3